US011696381B2

(12) United States Patent
Tietema et al.

(10) Patent No.: US 11,696,381 B2
(45) Date of Patent: Jul. 4, 2023

(54) CONVERTER FOR DRIVING A LOAD, A LED DRIVER AND A LED LIGHTING APPARATUS

(71) Applicant: SIGNIFY HOLDING B.V., Eindhoven (NL)

(72) Inventors: Jacob Roelof Tietema, Shanghai (CN); Fleming Hoaming Fu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 10 days.

(21) Appl. No.: 17/601,973

(22) PCT Filed: Apr. 6, 2020

(86) PCT No.: PCT/EP2020/059784
§ 371 (c)(1),
(2) Date: Oct. 7, 2021

(87) PCT Pub. No.: WO2020/207976
PCT Pub. Date: Oct. 15, 2020

(65) Prior Publication Data
US 2022/0159805 A1   May 19, 2022

(30) Foreign Application Priority Data

Apr. 11, 2019  (WO) ................ PCT/CN2019/082284
Apr. 29, 2019  (EP) ...................................... 19171690

(51) Int. Cl.
*H05B 45/30*   (2020.01)
*H05B 45/385*   (2020.01)

(52) U.S. Cl.
CPC ................................ *H05B 45/385* (2020.01)

(58) Field of Classification Search
CPC ........ H05B 45/14; H05B 45/38; H05B 45/39; H05B 45/375; H05B 45/382; H05B 45/385; H05B 45/3725; H02M 3/33507; H02M 3/33523; H02M 3/33569; H02M 3/33576
See application file for complete search history.

(56) References Cited

U.S. PATENT DOCUMENTS

| 7,869,235 B2 * | 1/2011 | Lin ........................ H02M 1/34 |
| | | 363/21.18 |
| 9,083,250 B2 * | 7/2015 | Adragna ........... H02M 3/33507 |
| 10,103,616 B1 * | 10/2018 | Lin ........................ H02M 1/083 |

(Continued)

FOREIGN PATENT DOCUMENTS

| EP | 2256912 A1 | 12/2010 |
| JP | 2017060329 A | 3/2017 |
| WO | 2005069469 A1 | 7/2005 |

*Primary Examiner* — Tung X Le

(57) ABSTRACT

A converter for driving a load has a main switch for controlling, at a switching frequency, the path of current flow through a power inductor and power commutation thereof so as to provide an output. A hysteretic control circuit generates a burst signal for turning on and off the power commutation to implement a burst mode operation with a burst frequency lower than the switching frequency. An adjusting circuit adjusts the upper threshold and/or the lower threshold of the hysteretic control in dependence on the detected burst signal. This burst mode hysteresis controlled converter in this way has the hysteresis adapted in dependence on the load being driven so that load regulation problems are reduced.

15 Claims, 7 Drawing Sheets

(56) References Cited

U.S. PATENT DOCUMENTS

| | | |
|---|---|---|
| 2008/0175029 A1 | 7/2008 | Jung et al. |
| 2011/0080112 A1* | 4/2011 | Shearer ............... H05B 45/10 |
| | | 323/273 |
| 2011/0194309 A1* | 8/2011 | Gaknoki ........... H02M 3/33515 |
| | | 363/21.01 |
| 2011/0310639 A1* | 12/2011 | Hsu ................... H02M 3/33561 |
| | | 363/21.14 |
| 2013/0038227 A1 | 2/2013 | Yan et al. |
| 2013/0093356 A1* | 4/2013 | Green ................. H05B 45/385 |
| | | 315/297 |
| 2016/0072391 A1 | 3/2016 | Sato |
| 2017/0012538 A1* | 1/2017 | Barrenscheen ... H02M 3/33507 |

* cited by examiner

CONVERTER FOR DRIVING A LOAD, A LED DRIVER AND A LED LIGHTING APPARATUS

CROSS-REFERENCE TO PRIOR APPLICATIONS

This application is the U.S. National Phase application under 35 U.S.C. § 371 of International Application No. PCT/EP2020/059784, filed on Apr. 6, 2020, which claims the benefits of European Patent Application No. 19171690.1, filed on Apr. 29, 2019 and Chinese Patent Application No. PCT/CN2019/082284, filed on Apr. 11, 2019. These applications are hereby incorporated by reference herein.

FIELD OF THE INVENTION

This invention relates to a converter for driving a load, for example for use as a stand-by power supply. For example, the converter may be used for generating an auxiliary power supply within an LED-based lamp.

BACKGROUND OF THE INVENTION

LED-based (retrofit) lamps are used more and more in home buildings and offices. Besides their high efficiency they also attract consumers due to new design features, different color temperatures, dimming ability etc.

To fit LED lighting to existing mains lighting fixtures, each LED light unit makes use of a converter circuit, for converting the AC mains into a DC drive signal, and also for reducing the voltage level.

The converter circuit typically comprises a rectifier and a switch mode power converter. One example of switch mode power converter is a ringing choke converter (RCC) based power converter. An RCC-based buck or boost or flyback converter is a typical self-oscillation converter in which the cyclic operation of the switching is self-controlled, and is widely used as a low cost LED driver. It often includes a flyback transformer with a primary side winding and a secondary side winding, and the secondary side winding delivers power to the output load through an output diode.

In addition to providing the power for the LED light unit, a lighting driver typically also needs to generate an auxiliary power supply. This power supply is for example used for powering MCUs, sensors, lighting controllers (such as a DALI controller) or other controllers, and is implemented as a constant voltage power supply.

The auxiliary supply typically needs to have a regulated output voltage. Primary-side voltage regulation is preferred for controlling the output voltage from the primary side. It is more cost effective and robust over secondary-side regulation, since, first, the high-voltage or common-mode insulation of the control circuit is not needed in the primary-side control approach and second, auxiliary circuitry for powering the control part is simplified. Moreover, when placed on the primary side, the regulation circuitry is capable of processing any information from the mains in a very simple and effective way.

Primary side regulation for example may make use of the peak current in the primary side winding and the detected duty cycle of the output diode, and thereby derives a signal representing the average output current.

For a typical RCC, the peak switching current is relatively constant, and the converter is always operating in the Critical Conduction Mode (CCM). Due to these limitations, the converter has a relatively small dynamic range, since it is proportional to the dynamic range of the switching frequency.

One known method to increase the dynamic range is to make the peak current adaptive.

Another known method to increase the dynamic range is by operating the RCC in burst mode. This invention relates in particular to a burst mode control of the self-oscillating converter.

A primary side regulated burst mode control approach improves the dynamic range, but the load regulation is deteriorated. Poor load regulation results from the imperfect coupling factor of the flyback transformer, from a voltage sensing error of the auxiliary winding voltage of the flyback transformer due to ringing, and from a mismatch between the output voltage ripple and the primary side sensed voltage ripple.

It is noted that the imperfect low coupling factor of the flyback transformer is not limited to primary side controlled self-oscillating flyback burst mode converters. In fact, all primary side regulated flyback converters with output sensing via an auxiliary winding of the flyback transformer suffer from this issue. Generally, this issue is addressed by optimizing the transformer design.

The output voltage sensing error of the auxiliary winding voltage is for example caused by ringing of the reflected voltage, specifically after turning off the converter switch. This ringing voltage is higher than the actual reflected output voltage of the converter, and thereby causes an error of the peak detected reflected voltage. A known way of improving this is to sample the output voltage at a specific time when the converter switch is off instead of using a peak detector, with a simple sample and hold circuit.

The mismatch between the output voltage ripple and primary side sensed voltage is a large contributor for the poor load regulation of known circuits. The reflected peak detected sensed voltage can be tuned such that it is matched to the output load for one specific load condition, but the ripple for other load conditions will then differ, which causes poor load regulation. This mismatch is particularly an issue for self-oscillating converters, such as RCCs, operated in the burst mode.

There is therefore a need for an improved burst mode control of a switch mode converter, in particular to improve the load regulation.

SUMMARY OF THE INVENTION

It is a concept of the invention to provide a burst mode hysteresis controlled converter, in which the hysteresis is adapted in dependence on the load being driven, so that load regulation problems are reduced.

The invention is defined by the claims.

According to examples in accordance with an aspect of the invention, there is provided a converter for driving a load, comprising:

an input line for receiving power;
a power inductor coupled with the input line;
a main switch for controlling, at a switching frequency, the path of current flow through the power inductor and power commutation thereof so as to provide an output;
a hysteretic control circuit for turning off the power commutation when a feedback signal relating to the output reaches an upper threshold of the hysteresis control, and for turning on the power commutation when the feedback signal relating to the output drops to a lower threshold of the hysteresis control, wherein the hysteretic control circuit provides a burst signal for switching on and off of the power commutation to implement a burst mode operation with a burst frequency lower than the switching frequency, wherein the converter further comprises an adjusting circuit adapted to:
  detect the burst signal; and
  adjust the upper threshold and/or the lower threshold in dependence on the detected burst signal.

The invention thus provides a burst mode hysteresis controlled converter. The hysteresis is adapted in dependence on the detected burst signal, for example the duty cycle of the burst signal. This duty cycle depends on the load being driven. In this way, the circuit is adapted in response to the load, such that load voltage regulation is reduced. The burst mode control improves the dynamic range, and the adaptation of the hysteresis improves the load regulation. Feedforward compensation is used, enabling primary side control so avoiding the need for secondary side sensing. The effect of the change to the hysteresis levels is to alter the burst frequency/duty cycle, such that it is adapted to the load being driven.

The adjusting circuit is for example adapted such that if the detected burst signal duty cycle increases, the upper threshold is increased.

This applies when there is a large output load, so the switching lasts longer to support the heavy load.

The adjusting circuit is for example adapted such that if the detected burst signal duty cycle decreases, the upper threshold is decreased.

This applies when there is a small output load, so the switching does not need to last as long.

The converter may comprise a self-oscillating converter, and further comprises an auxiliary inductor magnetically coupled to the power inductor for providing a drive signal to a control terminal of the main switch by an induced voltage on the auxiliary inductor, wherein the auxiliary inductor is part of a self-oscillating circuit for providing switching of the main switch.

The invention may thus be applied to a self-oscillating converter, in which an auxiliary inductor is used to from a self-oscillating circuit for the self-oscillation at the switching frequency. This enables a low cost implementation.

The self-oscillating circuit may further comprise a drive capacitor in series between the auxiliary inductor and the control terminal such that the converter is a ringing choke converter, wherein the self-oscillating circuit is connected to the control terminal of the main switch and is adapted to turn on the main switch by a voltage on the auxiliary inductor due to induction and/or resonating.

This defines one preferred implementation of a self-oscillating converter circuit.

The converter may further comprise a peak current controlling circuit including:
  a current sensing resistor in series with the main switch and the main inductor, to sense the current flowing therethrough when the main switch is turned on; and
  a shunt switch connected to the control terminal of the main switch and adapted to turn off the main switch when the sensed current reaches a peak current threshold.

In this way, the main switch is opened when the current reaches the set peak threshold. This defines part of the high frequency switching cycle of the main switch.

The power inductor for example forms a primary side winding of an output transformer and the converter further comprises a secondary inductor of the transformer which forms a secondary side winding of the transformer and is electrically to be coupled to the load, forming a flyback converter. The hysteretic control circuit for example comprises a sensing inductor magnetically coupled to the secondary inductor for sensing an output voltage on the secondary inductor is thereby to generate the feedback signal.

The feedback uses a sensing inductor, and the control is thereby implemented as a primary side control, without requiring coupling of a secondary side signal, for example with an opto-coupler.

The hysteretic control circuit for example further comprises a comparing circuit with a first, optionally negative, input to the sensing inductor and an output to the main switch, and said comparing circuit further comprises a second, optionally positive, input to a reference supply that corresponds to the upper threshold and/or the lower threshold, wherein said output is said burst signal.

The adjusting circuit for example comprises a reference voltage adjusting circuit for adjusting a reference voltage of the comparing circuit.

In this way, by simple adjustment of a reference voltage of a comparing circuit, the control of the circuit operation is achieved in response to changes in the duty cycle of the burst signal.

The adjusting circuit for example comprises a circuit for selectively adding a variable voltage according to the burst signal to a fixed voltage, as the total reference voltage of the comparing circuit.

The comparing circuit for example comprises a Schmitt trigger circuit, and the hysteretic control circuit further comprises a first smoothing circuit between the sensing inductor and the negative input of the comparing circuit.

The adjusting circuit may comprise a second smoothing circuit for smoothing the low frequency voltage into a smoothed level, and the circuit for selectively adding a variable voltage depends on the smoothed level.

In this way, the proper operation of the comparing circuit and the adjusting circuit are ensured.

A rectifier circuit is for example provided receiving an external AC input and for generating the DC power received at the input line. The converter is for example a mains driven circuit.

The invention also provides a LED driver comprising:
  a main driver circuit for driving an LED;
  an interface to an auxiliary load; and
  a converter as defined above for driving the auxiliary load via the interface.

The invention also provides a LED lighting apparatus comprising the LED driver as defined above, and further comprising the LED and sensors as the auxiliary load.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a converter for driving a load has a main switch for controlling, at a switching frequency, the path of current flow through a power inductor and power commutation thereof so as to provide an output. A hysteretic control circuit generates a burst signal for turning on and off the power commutation to implement a burst mode operation with a burst frequency lower than the switching frequency. An adjusting circuit adjusts the upper threshold and/or the lower threshold of the hysteretic control in dependence on the detected burst signal. This burst mode hysteresis-controlled converter in this way has the hysteresis adapted in dependence on the load being driven so that load regulation problems are reduced.

The invention will be explained with reference to one preferred type of switch mode power converter; the ringing choke converter (RCC). The invention may be applied to other switch mode power converters generally and to other self-oscillating converters. The RCC is of particular interest as it provides a low cost implementation, but the concept underlying the invention, which relates to an adaptive burst mode control of the circuit, may be applied more generally, for example it can be applied to IC-based converter. The invention is also explained with reference to an example with an isolated load (through an output transformer), but the concept of the invention may be applied to non-isolated loads.

Figure 1:
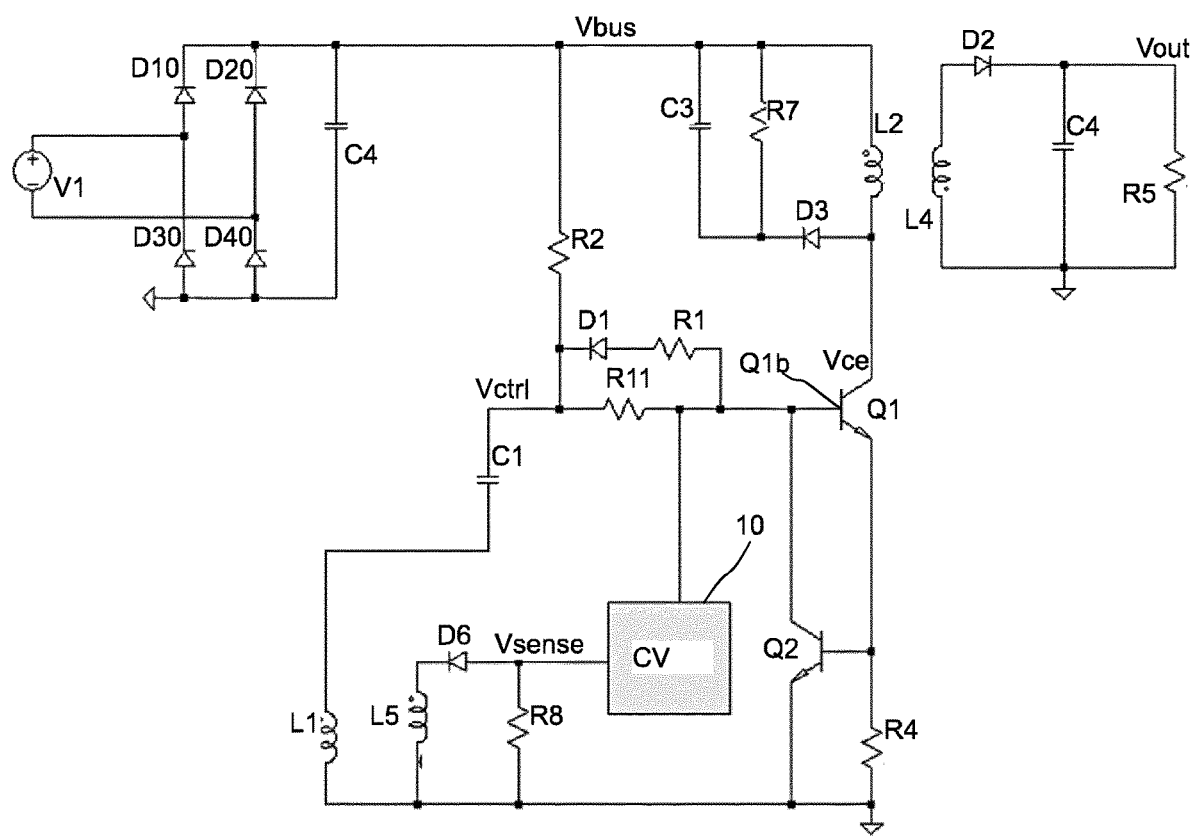
FIG. 1 shows an example of a Ringing Choke Converter ("RCC") circuit used for generating an auxiliary (i.e. constant voltage) power supply.

A possible implementation of an RCC circuit for use as an auxiliary power supply is shown in FIG. 1. The circuit comprises a driver for driving an output load shown as R5. This represents an auxiliary circuit such as a controller, a RF module or a sensor which may be present within a LED lamp.

The circuit is connected to a supply V1 which is preferably the AC mains. An EMI filter with inductor and capacitor is typically used, but is not shown in FIG. 1.

A diode bridge rectifier using diodes D10, D20, D30 and D40 provides rectification to a rectified DC output line Vbus. This comprises the power supply to the remainder of the circuit, which functions as a power converter. The EMI filter is for example between the rectifier bridge and the power converter. A capacitor C4 is across the output of the rectifier. The capacitor C4 is normally a bulk capacitor.

The output of the rectifier is connected to ground through a power inductor L2, which is the main primary side winding of a transformer, a main switch implemented as a main transistor Q1, and a current sensing resistor R4.

The transformer functions as an isolating element, and also as the inductive element of the switch mode converter, which operates as a flyback converter. In particular, a secondary side inductor L4 (i.e. the secondary winding of the transformer) forms the output stage, i.e. the flyback power stage, of the switch mode converter circuit with a capacitor C4 and an output diode D2. The circuit has an output at an output voltage Vout for the output load represented as R5.

The circuit includes a start-up circuit comprising a resistor R2 which charges up the base Q1b of the main transistor Q1 when the driver is turned on, and before the inductor current starts to ramp up. In this example, a diode D1 (and optional resistor R1) is provided to ensure the reliability of turning off the main transistor Q1. The diode D1 is in parallel with a base resistor R11.

The start-up of the circuit is achieved with the resistor R2 and a drive capacitor C1. The DC output line Vbus charges the capacitor C1 via the resistor R2, and when the voltage across C1, and in turn the base voltage of Q1, is sufficiently high, the main transistor Q1 starts to turn on. A voltage becomes accumulated on the main inductor L2, and so an associated voltage is induced on an auxiliary inductor L1.

The auxiliary inductor L1, which is an auxiliary primary side winding of the transformer, delivers current to the base Q1b of the main transistor Q1 via the drive capacitor C1, which is a high voltage bipolar transistor Q1. The voltage across the auxiliary winding L1 is proportional to the voltage across the main primary winding L2 due to the inductive coupling between the auxiliary primary winding L1 and the main primary winding L2.

During the on time of the main transistor Q1, the voltage across the winding L2 is proportional to the mains input voltage which in turn means that the current flowing through the base resistor R11 between the auxiliary winding L1 and the base Q1b of the main transistor Q1 is proportional to the (rectified) mains voltage. When the voltage at the DC output line Vbus of the rectifier is high, the voltage at the non-grounded terminal of the inductor L1 is high so that it delivers current to the base through the base resistor R11.

The drive capacitor C1 is in series between the auxiliary winding L1 and the base resistor R11. It converts the induced voltage on the auxiliary winding L1 into a current flowing into the base Q1b of the main transistor Q1. The bigger the drive capacitor C1, the stronger the driving current.

The circuit components D1, R11, R1 and C1 together form a primary side control circuit.

The current through the primary coil ramps up, and the coupling to the auxiliary primary winding L1 acts to rapidly turn on the main transistor Q1 to saturation. In particular, the auxiliary primary winding L1 current injects a base current to the main transistor Q1 through the base resistor R11.

When the current reaches a certain level as decided by R4 and Q2 (a peak current controlling circuit), they turn off the main transistor Q1, and the main transistor Q1 leaves the saturation region and the collector-emitter voltage increases. The primary winding voltage then will decrease, and the voltage on the auxiliary winding L1 will also decrease, so that the main transistor is turned off.

The inductor current then flows through the flyback part of the circuit, comprising the flyback diode D3, capacitor C3 and resistor R7. The voltage on the auxiliary winding L1 reverses and accelerates the turning off the main transistor Q1. During switching off of the main transistor, the base charge of the main transistor Q1 is depleted via the drive capacitor C1, the resistor R1, the diode D1 and the auxiliary primary winding L1. After the energy on the secondary winding L4 is released, resonance at the main transistor Q1 will turn it on again and the process repeats. The output voltage is accumulated at the output/capacitor C4.

The oscillation of the auxiliary winding L1 with other capacitive components makes the auxiliary winding L1 become energized again and provides driving current to the main transistor Q1 to turn it on.

Thus, the circuit functions in a self-oscillating cyclic manner, switching the main transistor on and off. When the main transistor Q1 is off, the energy stored in the transformer is transferred to the secondary side, delivering an output current to the load R5 (and to the capacitor C4). When the main transistor is turned on, the capacitor C4 instead delivers the output current to the load R5.

For longer term (i.e. lower frequency) feedback control, another auxiliary winding L5 senses the output voltage on the secondary side inductor L4 and capacitor C4 and feeds it back to a voltage control block 10, which affects the burst operation of the high frequency switching when the output voltage reaches a first threshold. This voltage feedback control is used as the load R5 may often be a voltage-dependent load, such as sensor, MCU, etc.

The general architecture of the circuit shown in FIG. 1 is known, and there are many variations and additions to the known circuit, but which operate in the same general way, namely with an isolated flyback converter output stage, and using self-oscillation of a pair of inductors to implement the cyclic switching of the circuit.

Feedback is used to influence the timing of the switching cycles, thereby providing level control.

Feedback from the secondary side is known as secondary side control, for example via an opto-coupler, whereas control making use only of signals present at the primary side is known as primary side control. In each case, the control is used to regulate the output current for a constant current control or to regulate the output voltage for a constant voltage control.

In the example shown, the converter is used for generating a constant voltage auxiliary supply. The voltage control block 10 is for implementing a constant voltage control loop, based on sensing using the inductor L5, which is magnetically coupled to the secondary winding L4 to provide voltage sensing. A diode D6 and resistor R8 generate a voltage sensing signal Vsense for the constant voltage control block 10.

Figure 2:
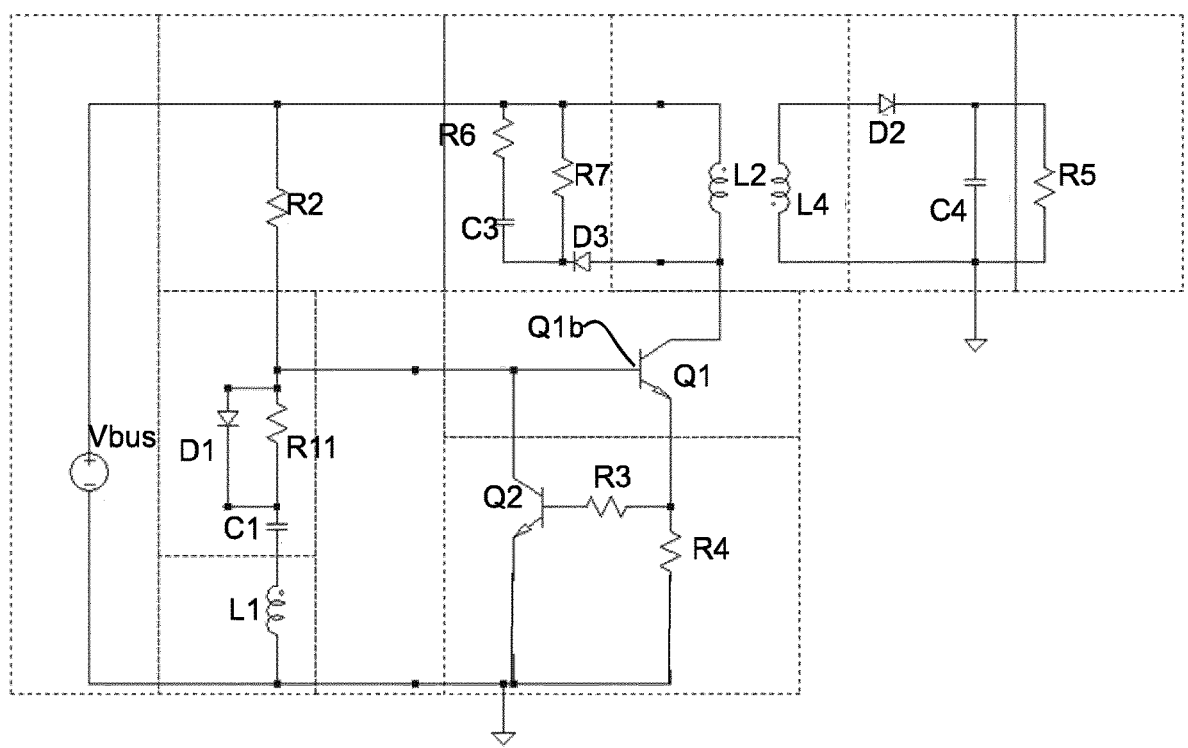
FIG. 2 shows the ringing choke converter with the known feedforward control omitted, and is used to show the building block for the hysteretic controlled burst mode arrangement of the invention.

FIG. 2 shows the ringing choke converter with the known feedforward control omitted. It is used to show the building block for the hysteretic controlled burst mode arrangement of the invention. The same components as in FIG. 1 are given the same references. An additional resistor R6 is shown in the flyback circuit as well as a base resistor R3 for the transistor Q2.

For a typical RCC, the peak switching current is relatively constant, and the converter is always operating in the Critical Conduction Mode (CCM). As a result, the converter has a relatively small dynamic range, since it is proportional to the dynamic range of the switching frequency.

One method to increase the dynamic range is to also make the peak current adaptive. Another known method to increase the dynamic range is by operating the RCC in a burst mode.

Figure 3:
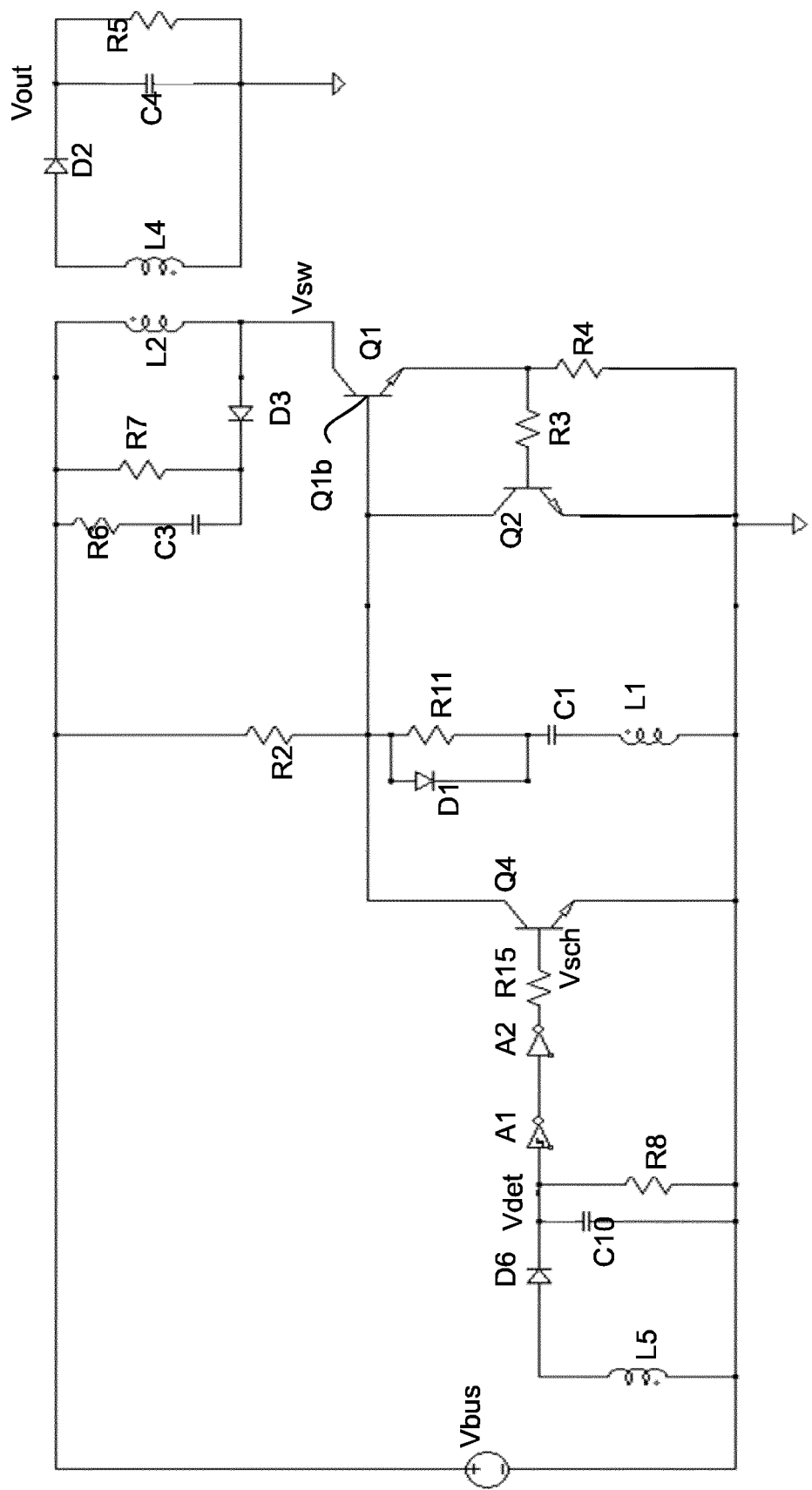
FIG. 3 shows a simplified implementation of a burst mode RCC.

FIG. 3 shows a simplified known implementation of a burst mode RCC, of FIG. 1.

FIG. 3 shows the circuit of FIG. 2 with the addition of the primary side regulation circuit for providing burst mode operation. As in FIG. 1, the output voltage is sensed via a sensing winding L5 which is magnetically coupled to the auxiliary winding L4 of the flyback transformer and with a peak detector D6, R8.

The inductors L1, L2, L4 and L5 are for example all coupled with a coupling factor of 1. The voltage detected by the sensing winding L5 will be termed a feedback signal.

The feedback signal is used to generate a detection voltage Vdet which is provided to the base of a burst mode control transistor Q4 through an inverting Schmitt trigger A1, an inverter A2 and a base resistor R15. The Schmitt trigger A1 and inverter A2 may together be considered to be a Schmitt trigger circuit. Of course, a non-inverting Schmitt trigger may be used. The transistor Q4, when turning on, can completely turn off the main transistor Q1, namely disabling the high frequency switching in an off state in the burst operation. Otherwise the transistor Q4, when turning off, enables the high frequency switching of the main transistor Q1.

The capacitor C10 functions as a smoothing circuit between the sensing inductor L5 and the Schmitt trigger circuit.

The diode D6 and resistor R8 generate a voltage sensing signal Vdet for controlling the control transistor Q4.

By passing the voltage through a Schmitt trigger, hysteretic control is implemented. In particular, the turn on/off (high frequency switching) of the transistor Q4 is enabled until an upper threshold is reached, and the high frequency switching of the transistor Q4 is disabled until a lower threshold is reached.

The output voltage of the converter is set by the winding ratio between the auxiliary winding L1 and the main inductor L2, together with the threshold voltage of the Schmitt trigger.

The transistor Q4, when turned on, performs the same function as the transistor Q2, namely to turn off the main transistor Q1, but with longer term control, at the lower burst frequency. In this way a burst mode control is implemented, whereby while transistor Q4 is turned off, the normal RCC cyclic operation takes place (this is a burst of operation) whereas while transistor Q4 is turned on, the main transistor Q1 is turned off.

The RCC control is implemented at a higher switching frequency than the burst mode frequency, which burst mode frequency is for example in the region 100 Hz to 200 Hz. The RCC switching frequency is typically of the order of tens or hundreds of kHz, for example greater than 10 kHz.

The burst frequency depends on how the output voltage rises and falls, which in turn alters the voltage on the sensing winding L5. This depends on the output load.

The burst frequency in particular depends on the hysteresis threshold, and the output capacitor discharging time, which is dependent on the load R5 connected to the output.

Figure 4:
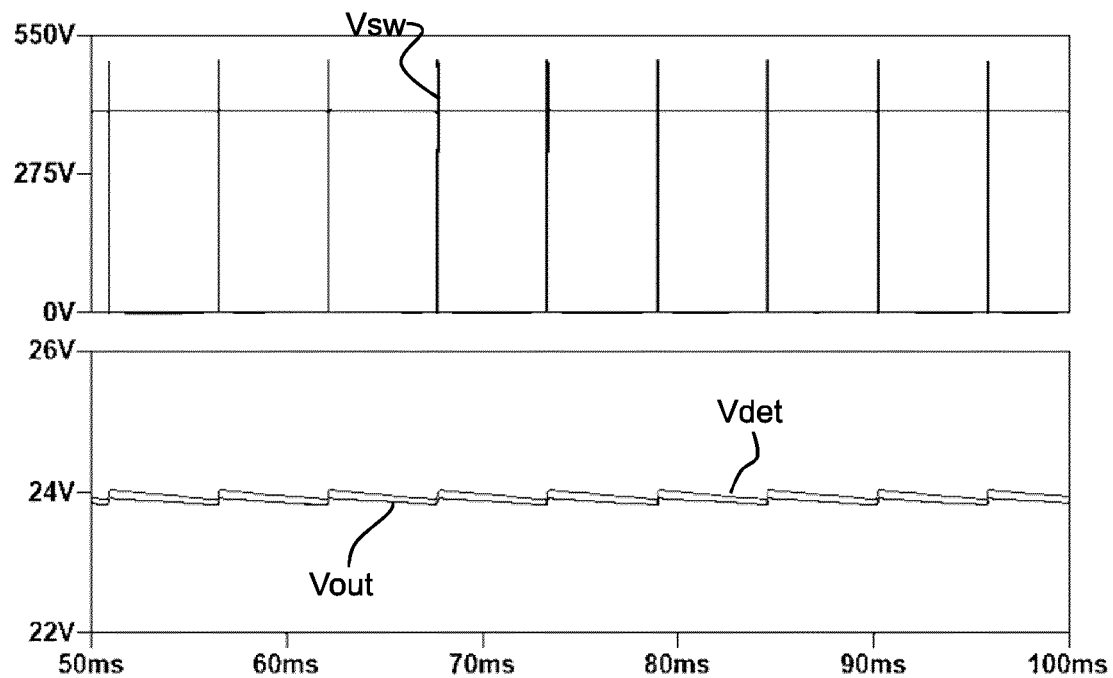
FIG. 4 shows waveforms for the circuit operation of FIG. 3 when there is a light load.

FIG. 4 shows waveforms for the circuit operation when there is a light load.

The top plot shows the switching bursts Vsw at the main switch Q1, with a period of approximately 5.6 ms (i.e. 180 Hz). The bursts defined by signal Vsw have a very short duty cycle. Each spike in the plot of FIG. 4 corresponds to a period of high frequency switching, but the individual switching signals are too short to be visible in the figure.

The bottom plot shows the output voltage Vout and the detected voltage Vdet across the inductor L5 and diode D6.

The output voltage is relatively stable at the desired 24V because the discharging time has been tuned for light load conditions.

Figure 5:
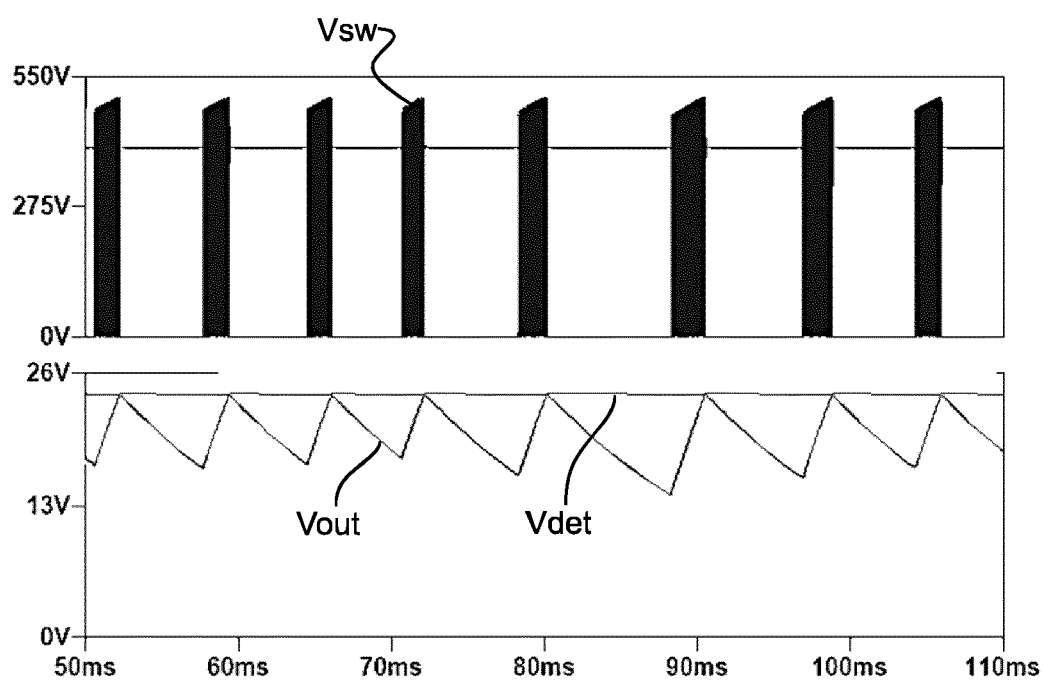
FIG. 5 shows waveforms for the circuit operation of FIG. 4 when there is a heavy load.

FIG. 5 shows waveforms for the circuit operation when there is a heavy load.

The top plot again shows the signal Vsw which defines the switching bursts at the main switch Q1. However, the bursts defined by the signal Vsw have an increased duty cycle. In addition, the period has increased to approximately 7.9 ms (i.e. 130 Hz).

The bottom plot shows the output voltage Vout and the detected voltage Vdet across the sensing inductor L5 and diode D6. The upper threshold for disabling the high frequency RCC switching is 26V as shown, in this example. The lower threshold for enabling the high frequency RCC switching is around 18V.

The output voltage now shows significant ripple and a shift in the average value to significantly below 24V. This is exaggerated by selecting relatively long restart timing and a relatively small output capacitance. It clearly shows the poor load regulation due to the difference in voltage ripple on the primary side sensed voltage and output voltage, for light and heavy loads.

Figure 6:
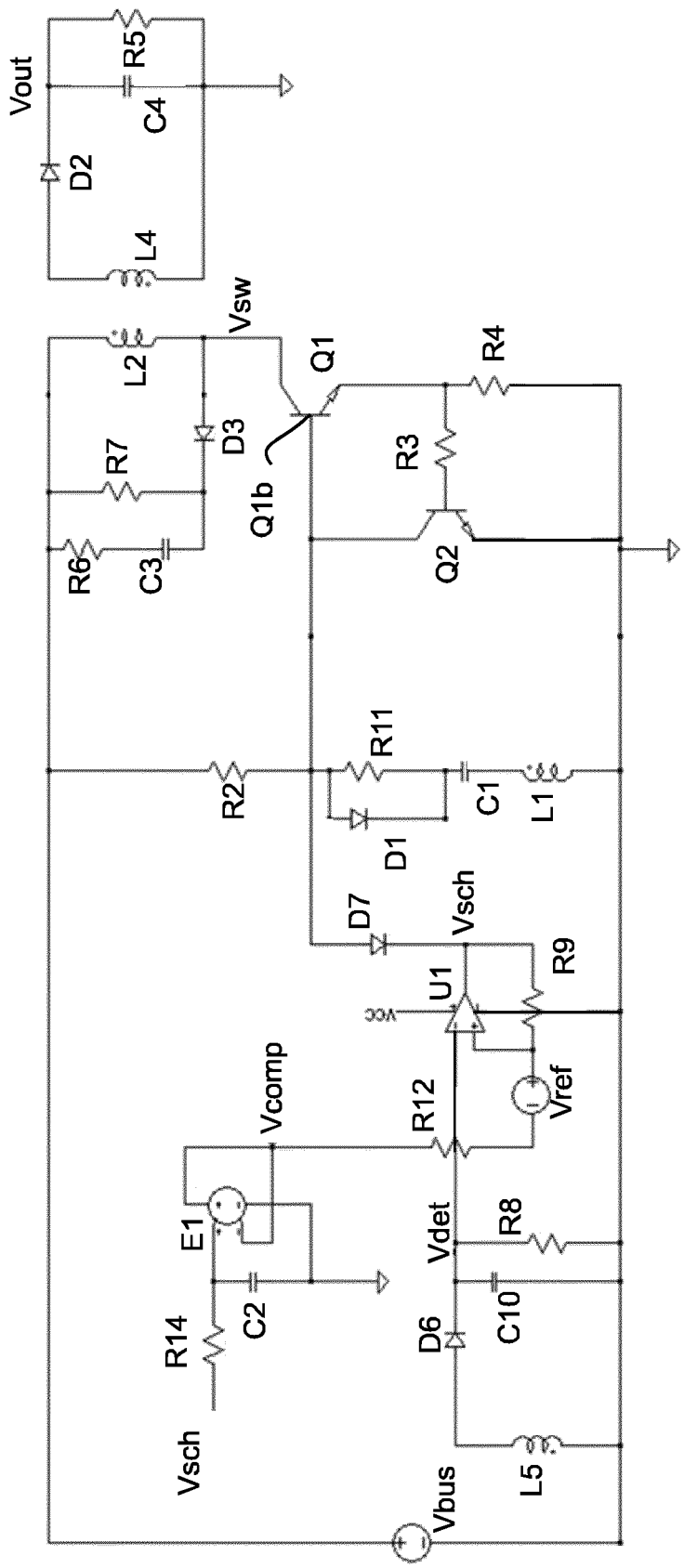
FIG. 6 shows a circuit of the invention, as a modification to the circuit of FIG. 3 with the added functions shown in schematic form.

FIG. 6 shows a circuit of the invention, as a modification to the circuit of FIG. 3. The modifications are shown in simplified form.

As in FIG. 3, the circuit uses a Schmitt trigger circuit to realize the burst mode operation.

The Schmitt trigger circuit is realized by a comparing circuit U1, such as an opamp circuit, with positive feedback through a feedback resistor R9. An inverting (negative) input is connected to the sensing inductor L5 and an output is coupled to the main switch Q1 through diode D7. The function of the comparing circuit is to pull down the base Q1b and it does not need to deliver current to the base Q1b. Thus, the diode D7 can be used limit the current flow to a single direction.

The non-inverting (positive) input is connected to the reference supply, which sets the upper threshold (and/or the lower threshold, in another implementation). The reference voltage source Vref thus sets the hysteresis levels and is applied to the non-inverting terminal. The output of the opamp U1 is a Schmitt trigger output signal Vsch, which in turn defines the timing of the burst periods seen in the signal Vsw. The signal Vsch may thus be defined as a burst signal.

There is additional compensation by a further compensation signal Vcomp. This compensation signal is generated by an adjusting circuit. It has the function of adjusting the reference voltage applied to the Schmitt trigger circuit. In one example, the adjusting circuit implements an integration of the Schmitt trigger output Vsch to generate a compensation voltage. The adjusting circuit is shown schematically as a controllable voltage source E1. The controllable voltage source generates the compensation signal Vcomp which depends on the burst signal Vsch at the input to the adjusting circuit, and in particular depends on an integrated of the voltage waveform Vsch. The controllable voltage Vcomp is in series with the reference voltage Vref and they are thereby summed to set to threshold of the Schmitt trigger circuit.

A capacitor C2 and resistor form a low pass filter which functions as a second smoothing circuit for smoothing the Schmitt trigger output signal before it is provided to the adjusting circuit.

The effect of the controllable voltage Vcomp may be to adjust the upper threshold or the lower threshold, or both, of the Schmitt trigger circuit in dependence on the signal Vsch.

This signal Vsch again is the burst signal which sets the burst mode operation and is used to switch on and off of the high frequency power commutation by the main transistor Q1 and the shunt switch Q2. The burst mode operation has a burst frequency lower than the switching frequency, as explained above.

The controllable voltage source E1 for example comprises an integrating opamp circuit. The reference voltage source Vref may for example implemented as a resistor divider circuit (including offset voltage).

Figure 7:
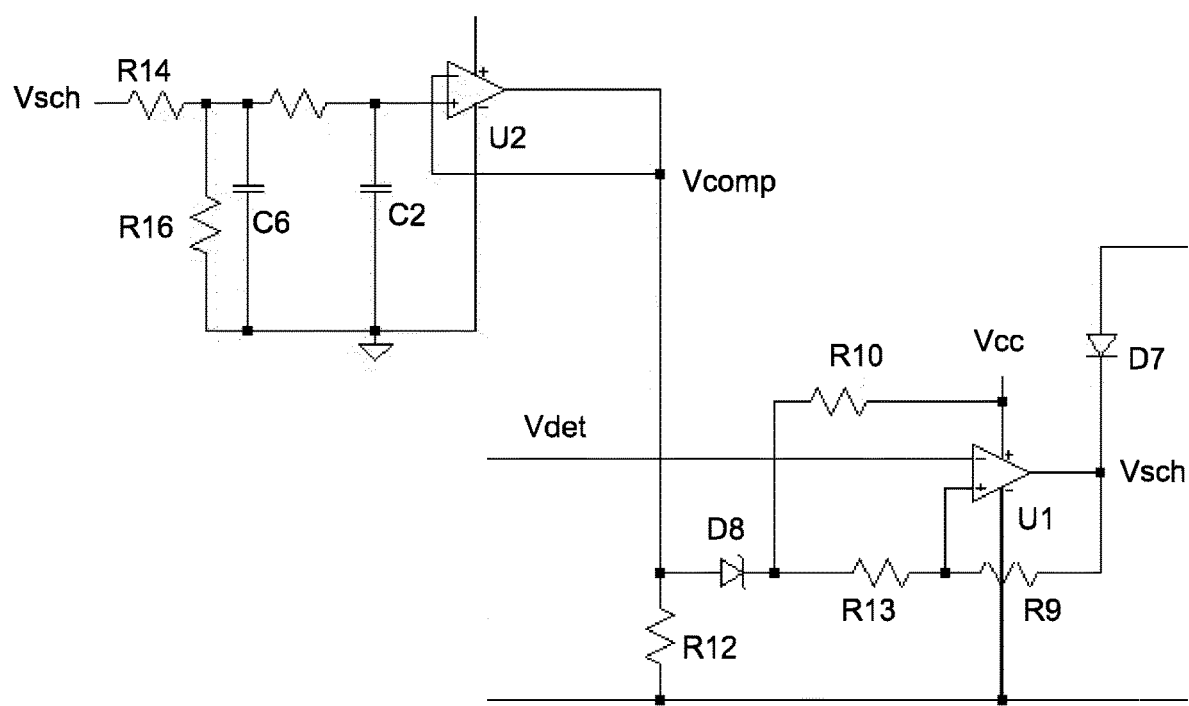
FIG. 7 shows a more detailed circuit of the reference adjusting circuit.

FIG. 7 shows a more detailed implementation of the adjusting circuit E1 and Schmitt trigger circuit of FIG. 6. The generation of the detection signal Vdet is the same as in FIG. 6 (and not shown) and the circuit downstream of the burst signal Vsch is the same as in FIG. 6 (and not shown).

The reference voltage source and comparator are implemented by a Zener diode D8, opamp U1 and associated resistor circuit R9, R10, R12, R13.

The controllable voltage source of the adjusting circuit is implemented by an integrating opamp U2 and smoothing capacitor C2. A more practical integration filter is shown with RC circuit R14 and C6 in addition to the smoothing capacitor C2, providing an additional filter pole. The resistor pair R14, R16 also functions as an attenuator. The attenuator can be tuned to set the feedforward compensation factor on Vcomp.

It will be appreciated that many other circuit implementations are possible, and the circuit of FIG. 7 is simply an example.

The integrated output Vcomp, derived from the signal Vsch, is a measure of the burst signal duty cycle. A larger duty cycle will give rise to a larger integrated output, with a higher DC (i.e. average over time) value. The compensation gain and reference voltage can be tuned to the system parameters by changing the feedback within the controllable voltage source E1.

In one example, the adjusting circuit is adapted such that if the detected burst signal duty increases, the upper threshold is increased. If the detected burst signal duty cycle decreases, the upper threshold is decreased.

In the example shown, the adjusting circuit selectively adds a variable voltage Vcomp according to the burst signal to a fixed reference voltage Vref, to define the total reference voltage of the comparing circuit U1. Of course, other ways to implement a variable voltage provided to the Schmitt trigger circuit (and in this particular example to the comparting circuit U1) may be used.

Figure 8:
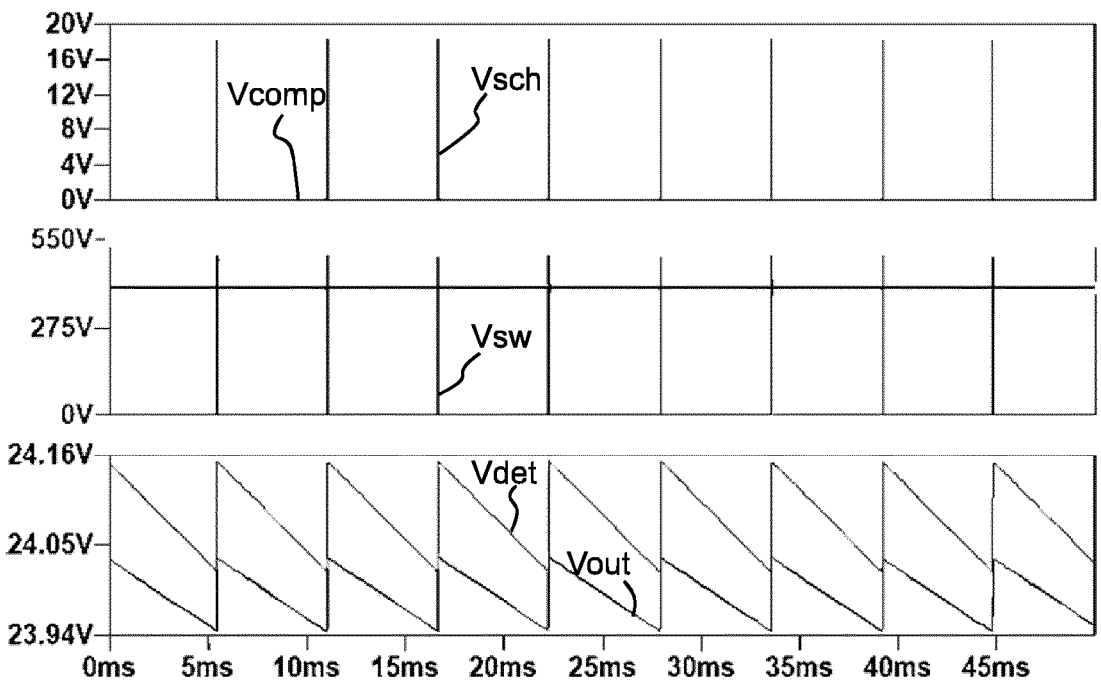
FIG. 8 shows the equivalent waveforms to FIG. 4 but for the circuit of FIG. 6.

FIG. 8 shows the equivalent waveforms to FIG. 4 but for the circuit of FIG. 6.

The top plot shows the Schmitt trigger output signal Vsch (i.e. the burst signal which is used to control the driving of the transistor Q4), with a period of approximately 5.6 ms (i.e. 180 Hz). In addition, the compensation voltage Vcomp is shown. The compensation voltage is zero, because the circuit is designed for operation with the light load, hence no compensation is needed.

The second plot shows the switch bursts Vsw, which have timing corresponding to the signal Vsch.

The bottom plot shows the output voltage Vout and the detected voltage Vdet across the inductor L5 and diode D6.

The output voltage is again relatively stable at the desired 24V (note the small difference in values along the y-axis).

Figure 9:
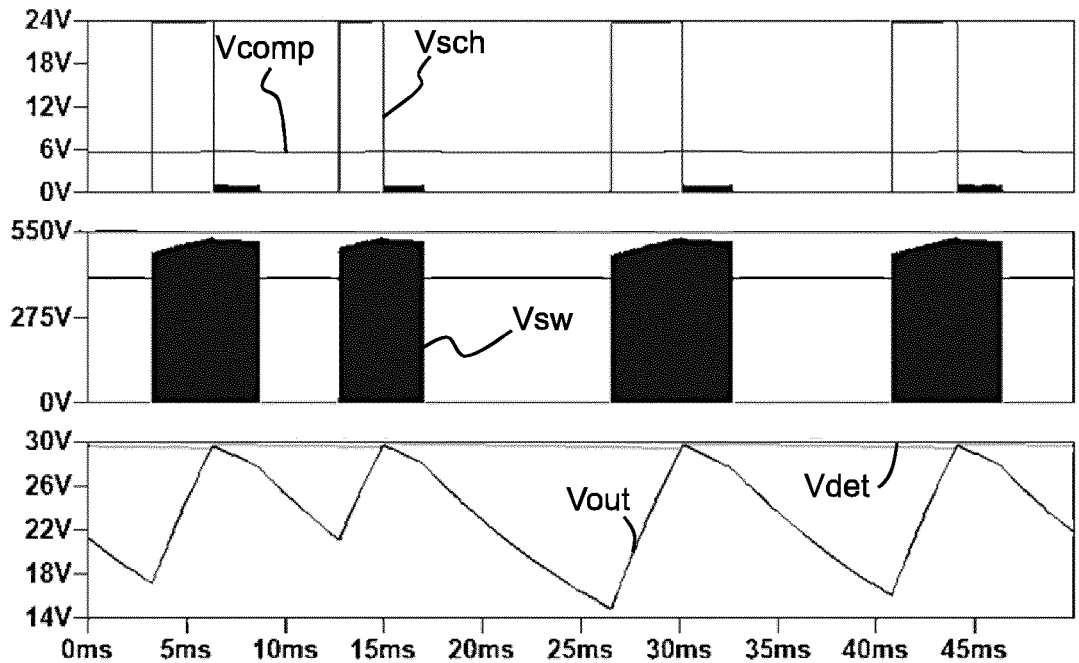
FIG. 9 shows the equivalent waveforms to FIG. 5 but for the circuit of FIG. 6.

FIG. 9 shows the equivalent waveforms to FIG. 5 but for the circuit of FIG. 6.

The top plot shows the Schmitt trigger output signal Vsch (i.e. the input to the base of transistor Q4), and again with a with an increased period and increased duty cycle. The compensation voltage Vcomp is shown as a fixed 6V level. The compensation voltage is now needed, because the higher load condition has been detected.

The bottom plot shows the output voltage Vout and the detected voltage Vdet across the inductor L5 and diode D6.

The maximum value of the output voltage is increased (from 26V in FIG. 5 to 30V in FIG. 9). This is the result of the 6V compensation voltage, which after processing by the opamp U1 and associated components, gives rise in this example to a 4V change in the upper threshold voltage of the Schmitt trigger circuit. The larger swing in the output voltage Vout, caused by the increased load, is thus compensated by increasing the upper threshold voltage of the Schmitt trigger circuit. In this way, the average voltage remains at the desired 24V.

In this way, the load regulation is improved independent of the load connected to the output.

The invention basically involves detecting that load conditions have changed, and adjusting the burst mode accordingly. The example above is based on identifying changes in the burst mode duty cycle as indicative of load changes. However, it is also clear from the description above that burst frequency changes also arise in response to load variations, so that the burst frequency may also be used to detect when changes to the hysteresis thresholds may be applied.

The example above adapts the upper switching threshold of the hysteresis control. However, the lower threshold may also or instead be adapted.

The invention is described above in connection with a buck converter, but the same approach may be taken for a buck, boost, buck-boost or flyback converter architecture.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A converter for driving a load, comprising:
   an input line for receiving power;
   a power inductor coupled with the input line;
   a main switch for controlling, at a switching frequency, the path of current flow through the power inductor and power commutation thereof so as to provide an output;
   a hysteretic control circuit for turning off the power commutation when a feedback signal relating to the output reaches an upper threshold of the hysteresis control, and for turning on the power commutation when the feedback signal relating to the output drops to a lower threshold of the hysteresis control, wherein the hysteretic control circuit provides a burst signal for switching on and off of the power commutation to implement a burst mode operation with a burst frequency lower than the switching frequency,
   wherein the converter further comprises an adjusting circuit adapted to:
   detect the burst signal; and
   adjust the upper threshold and/or the lower threshold in dependence on the detected burst signal.

2. The converter as claimed in claim 1, wherein the adjusting circuit is adapted such that if the detected burst signal duty cycle increases, the upper threshold is increased.

3. The converter as claimed in claim 1, wherein the adjusting circuit is adapted such that if the detected burst signal duty cycle decreases, the upper threshold is decreased.

4. The converter as claimed in claim 1, comprising a self-oscillating converter, and further comprising an auxiliary inductor magnetically coupled to the power inductor for providing a drive signal to a control terminal of the main switch by an induced voltage on the auxiliary inductor, wherein the auxiliary inductor is part of a self-oscillating circuit for providing switching of the main switch.

5. The converter as claimed in claim 4, wherein the self-oscillating circuit further comprises a drive capacitor in series between the auxiliary inductor and the control terminal such that the converter is a ringing choke converter, wherein the self-oscillating circuit is connected to the control terminal of the main switch and is adapted to turn on the main switch by a voltage on the auxiliary inductor due to induction and/or resonating.

6. The converter as claimed in claim 5, wherein the converter further comprises a peak current controlling circuit including:
   a current sensing resistor in series with the main switch and the main inductor, to sense the current flowing therethrough when the main switch is turned on; and
   a shunt switch connected to the control terminal of the main switch and adapted to turn off the main switch when the sensed current reaches a peak current threshold.

7. The converter as claimed in claim 1, wherein the power inductor forms a primary side winding of a transformer and wherein the converter further comprises a secondary inductor of the transformer which forms a secondary side winding of the transformer and is electrically to be coupled to the load, forming a flyback converter, wherein the hysteretic control circuit comprises a sensing inductor magnetically coupled to the secondary inductor for sensing an output voltage on the secondary inductor thereby to generate the feedback signal.

8. The converter as claimed in claim 7, wherein the hysteretic control circuit further comprises a comparing circuit with a first, optionally negative, input to the sensing inductor and an output to the main switch, and said comparing circuit further comprises a second, optionally positive, input to a reference supply that corresponds to the upper threshold and/or the lower threshold, wherein said output is said burst signal.

9. The converter as claimed in claim 8, wherein the adjusting circuit comprises a reference voltage adjusting circuit for adjusting a reference voltage of the comparing circuit.

10. The converter as claimed in claim 9, wherein the adjusting circuit comprises a circuit for selectively adding a variable voltage according to the burst signal to a fixed voltage as the total reference voltage of the comparing circuit.

11. The converter as claimed in claim 10, wherein the comparing circuit comprises a Schmitt trigger circuit, and the hysteretic control circuit further comprises a first smoothing circuit between the sensing inductor and the negative input of the comparing circuit.

12. The converter as claimed in claim 10, wherein the adjusting circuit comprises a second smoothing circuit for smoothing the low frequency voltage into a smoothed level, and the circuit for selectively adding a variable voltage depends on the smoothed level.

13. The converter as claimed in claim 1, comprising a rectifier circuit for receiving an external AC input and for generating the DC power received at the input line.

14. A LED driver comprising:
   a main driver circuit for driving an LED;
   an interface to an auxiliary load; and
   the converter as claimed in claim 1 for driving the auxiliary load via the interface.

15. A LED lighting apparatus comprising the LED driver as claimed in claim 14, further comprising the LED and sensors as the auxiliary load.

\* \* \* \* \*